United States Patent
McGary

(10) Patent No.: US 8,396,193 B2
(45) Date of Patent: *Mar. 12, 2013

(54) SYSTEM AND METHOD FOR VOICE ACTIVATED SIGNALING

(75) Inventor: Faith McGary, Bethlehem, PA (US)

(73) Assignee: Grape Technology Group, Inc., Bethlehem, PA (US)

(*) Notice: Subject to any disclaimer, the term of this patent is extended or adjusted under 35 U.S.C. 154(b) by 60 days.

This patent is subject to a terminal disclaimer.

(21) Appl. No.: 12/985,513

(22) Filed: Jan. 6, 2011

(65) Prior Publication Data

US 2011/0158391 A1 Jun. 30, 2011

Related U.S. Application Data

(63) Continuation of application No. 11/506,151, filed on Aug. 17, 2006, now Pat. No. 7,929,671.

(60) Provisional application No. 60/709,468, filed on Aug. 17, 2005.

(51) Int. Cl.
*H04M 1/64* (2006.01)

(52) U.S. Cl. ............... 379/88.01; 379/88.03; 379/88.04; 704/275

(58) Field of Classification Search ..... 379/88.01–88.28
See application file for complete search history.

(56) References Cited

U.S. PATENT DOCUMENTS

| | | | |
|---|---|---|---|
| 5,526,406 A * | 6/1996 | Luneau | 455/563 |
| 5,764,731 A * | 6/1998 | Yablon | 379/88.15 |
| 6,167,255 A | 12/2000 | Kennedy et al. | |
| 6,370,506 B1 | 4/2002 | Ahluwalia | |
| 6,456,699 B1 * | 9/2002 | Burg et al. | 379/88.17 |
| 6,601,031 B1 | 7/2003 | O'Brien | |
| 2002/0090066 A1 * | 7/2002 | Gupta et al. | 379/88.03 |

* cited by examiner

*Primary Examiner* — Yuwen Pan
*Assistant Examiner* — Assad Mohammed
(74) *Attorney, Agent, or Firm* — Sofer & Haroun, LLP

(57) ABSTRACT

A system for facilitating communications with an automated response system includes a database for storing an address book entry. The address book entry includes a location name and contact number for a location that employs an automated response platform that does not accept voice commands. The address book entry also includes at least one stored voice command related to a navigation command of the automated response platform and one stored associated assigned keystroke for the command. A voice response signal digital signal processor receives a voice input from a user corresponding to the stored voice command. A telephonic signal generator is included, such that when the user utters the voice input corresponding to the stored voice command, the system recalls the stored associated assigned keystroke and delivers a signal corresponding to the keystroke as a telephonic signal to the automated response platform.

3 Claims, 7 Drawing Sheets

| | |
|---|---|
| Location Name Field 102<br>Voice Mail Office | Location Number Field 104<br>9195551111p##123456 |
| First Voice Command Field 106<br>SAVE (and code) | Associate Keystroke Field 108<br>7 |
| n(1) Voice Command Field 110<br>DELETE | n(1) Voice Command Field 112<br>3 |
| n(2) Voice Command Field 110<br>REPLY | n(2) Voice Command Field 112<br>1 |
| n(3) Voice Command Field 110<br>REPEAT | n(3) Voice Command Field 112<br>2 |
| n(4) Voice Command Field 110<br>NEXT | n(4) Voice Command Field 112<br>5 |
| n(5) Voice Command Field 110<br>HELP | n(5) Voice Command Field 112<br>0 |

Address Book Entry 100

FIGURE 3

| Location Name Field 202<br>Voice Mail Mobile | Location Number Field 204<br>9195551234p##7654321 |
|---|---|
| First Voice Command Field 206<br>SAVE (and code) | Associate Keystroke Field 208<br>3 |
| n(1) Voice Command Field 210<br>DELETE | n(1) Voice Command Field 212<br>2 |
| (2) Voice Command Field 210<br>REPEAT | n(2) Voice Command Field 212<br>6 |
| n(3) Voice Command Field 210<br>NEXT | n(3) Voice Command Field 212<br>7 |
| n(4) Voice Command Field 210<br>HELP | n(4) Voice Command Field 212<br>0 |

Address Book Entry 200

FIGURE 4

| Location Name Field 302<br>My Bank | Location Number Field 304<br>9195552222p |
|---|---|
| First Voice Command Field 306<br>BALANCE (and code) | Associate Keystroke Field 308<br>1 - 1 |
| n(1) Voice Command Field 310<br>ATM DEBITS | n(1) Voice Command Field 312<br>2 - 2 - 2 |
| (2) Voice Command Field 310<br>BACK | n(2) Voice Command Field 312<br>* |
| n(3) Voice Command Field 310<br>OPERATOR | n(3) Voice Command Field 312<br>0 |

Address Book Entry 300

FIGURE 5

SYSTEM AND METHOD FOR VOICE ACTIVATED SIGNALING

RELATED APPLICATION

This application is a continuation of U.S. patent application Ser. No. 11/506,151, filed on Aug. 17, 2006 now U.S. Pat. No. 7,929,671, which in turn claims the benefit of priority from U.S. Provisional Patent Application No. 60/709,468, filed on Aug. 17, 2005, the entirety of which are incorporated herein by reference.

FIELD OF THE INVENTION

The present invention relates to facilitating use of automated response telephonic communication systems. More particularly, the present invention relates to facilitating navigation of automated response telephonic communication systems using voice commands.

BACKGROUND

In standard telephony communications, in addition to the signals (DTMF Dual Tone Multi-Frequency signaling) transmitted during call origination such as the destination phone number and call termination signal (on-hook signal), a user may also wish to transmit signals to a destination while the call or communication session is in a stable "talking" state. A common example in which such in-call signaling is commonly used is communication with an automated response system, such as a voice mail system, call routing system, financial account information system, etc.

In such automated response systems, typical conventional hierarchical menus are employed such as menus used in a bank's automated account information system. For example, upon dialing the bank's phone number to reach the automated account information system, a user may press the "1," "2," or "3" key to check their balance, withdrawals, or deposits, respectively. When a user presses a key, a DTMF signaling message is transmitted to the bank's automated account information system where it is interpreted and compared against a list of recognized requests based on the user's current position within the menu. If the automated account information system detects a match, then the requested function is performed.

Because of the hierarchical nature of the account functions menu, a user may have to remember a sequence of keystrokes to perform some functions. For example, to check all ATM withdrawals the user must press "2," "2," and "2" sequentially. In another example, if the user then wishes to check all direct deposits, the user must press "a," "3," "2," and "3." These sequences may be difficult for a user to remember causing the user to rely upon automated voice prompts to recite the keystrokes for various options, which may be time consuming. Furthermore in many mobile environments, particularly hands free (driving) situations, pressing the keys can be even more difficult as it requires added attention.

Speech or voice recognition (VR) technology, which has been used in computer applications such as word processing, may also be used in telephony devices and systems. A communication terminal such as a mobile/wireless phone, wireline phone, etc. . . . , may include a feature that provides for certain voice-activated commands (VACs) to perform call origination and termination functionality. This is particularly true in the hands free mobile environment.

For example, a user may speak the command "call John," which is then processed by the VR hardware and/or software in the communication terminal and translated into an instruction to dial a phone number associated with the label "John." Similarly, a user may speak the command "hang up," which, after processing by the VR hardware and/or software, is translated into an instruction to disconnect from the current communication session (an on-hook signal).

However, traditional automated response systems using in-call DTMF signaling to navigate their various menus do not also accept VR commands.

OBJECTS AND SUMMARY

It is the object of the present invention to provide a system and method whereby VR technology can be used to facilitate the transmission of predefined navigation signals during a stable phone call or communication session.

Thus, according to the present invention information is transmitted to a destination by associating a voice command with the destination and associating a signaling message with the voice command. After establishing communication with the destination, speech input that is received from a user is interpreted and compared with the voice command to determine if there is a match. If the speech input matches the voice command, then the menu navigation signaling message associated with the voice command is transmitted to the destination.

In such an arrangement, the user is relieved of the burden of having to remember the keystrokes to perform a specific operation or function by embedding the signal(s) corresponding to the operation in the signaling message. Moreover, because the signaling message is associated with the voice command and the destination, the same voice command may be used to perform an operation on more than one destination.

For example, a user may have multiple bank accounts such that when a first bank is called, speaking the command "balance" results in a first signaling message (e.g., a specific key sequence) being transmitted to the first bank's automated account information system. Likewise, when a second bank is called, speaking the command "balance" results in a second signaling message, different from the first signaling message, being transmitted to the second bank's automated account information system.

The present invention, therefore, allows a user to conveniently verbally issue DTMF commands while a call is in progress. More specifically, in accordance with an exemplary embodiment, one or more user defined spoken command words are associated with signaling messages, each having a DTMF signal or sequence thereof, such that the signaling messages are context-sensitive with regard to the number or destination dialed. Advantageously, the present invention allows a user to use a consistent set of spoken command words to communicate with a variety of different automated response systems.

To this end, the present invention provides for a system for facilitating communications with an automated response system includes a database for storing an address book entry. The address book entry includes a location name and contact number for a location that employs an automated response platform that does not accept voice commands. The address book entry also includes at least one stored voice command related to a navigation command of the automated response platform and one stored associated assigned keystroke for the command. A voice response signal digital signal processor receives a voice input from a user corresponding to the stored voice command. A telephonic signal generator is included, such that when the user utters the voice input corresponding to the stored voice command, the system recalls the stored associated assigned keystroke and delivers a signal corresponding to the keystroke as a telephonic signal to the automated response platform.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 3 is a sample address book entry, in accordance with one embodiment of the present invention;

FIG. 4 is a sample address book entry, in accordance with another embodiment of the present invention;

FIG. 5 is a sample address book entry, in accordance with another embodiment of the present invention.

DETAILED DESCRIPTION

Figure 1:
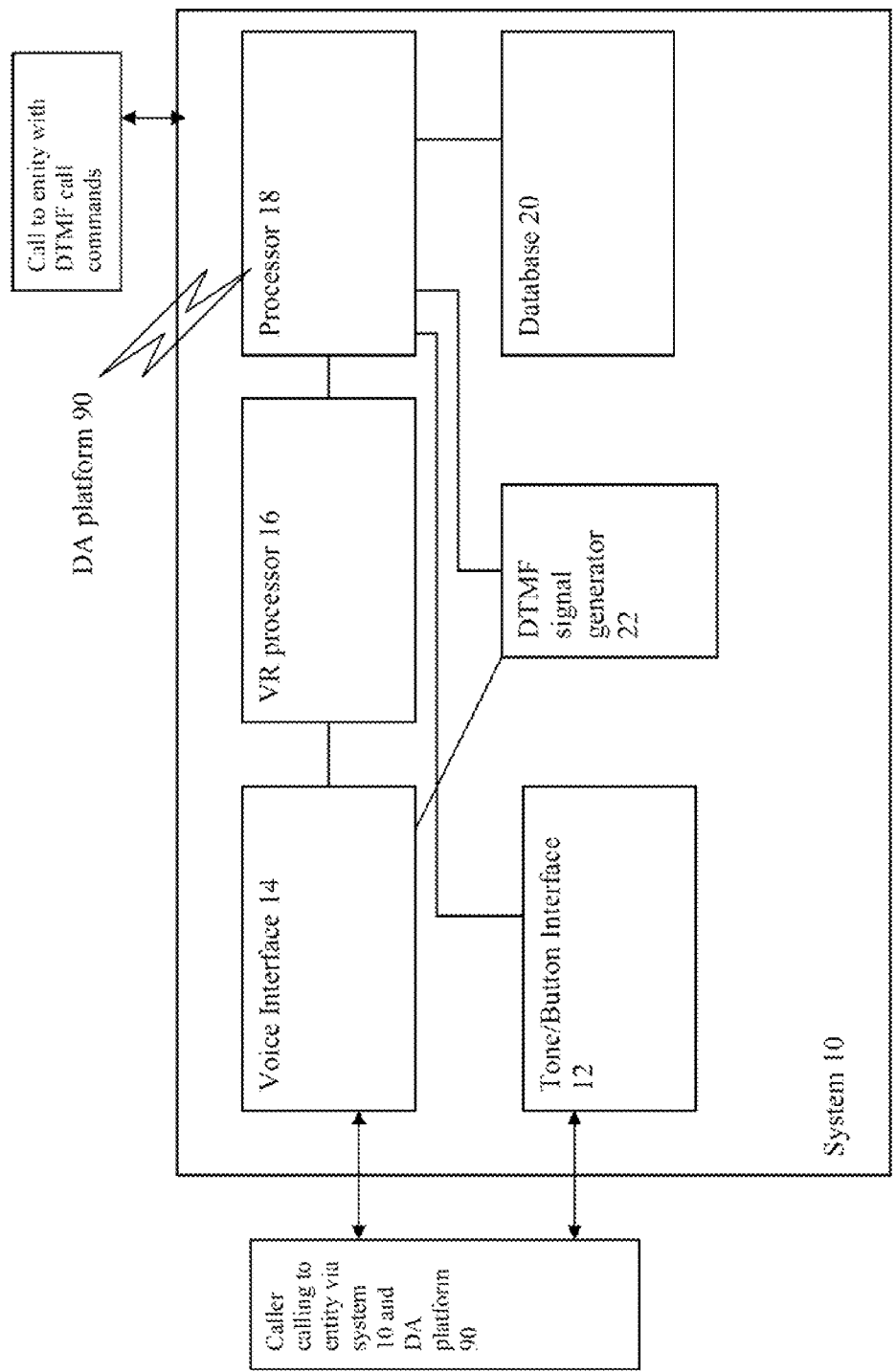
FIG. 1 illustrates a voice activated signaling system, in accordance with one embodiment of the present invention.

In one embodiment of the present invention as illustrated in FIG. 1, a voice activated signaling system 10 is shown having a button/tone interface module 12, a voice interface module 14, a voice response digital signal processor module 16, a processor module 18, a storage module 20 and a telephonic signal (DTMF) generator module 22. In accordance with one embodiment of the invention, system 10 could be employed on a typical cell phone that contains these modules as described in more detail below.

Button/tone interface module 12 is a typical interface used on most telephonic and other electronic devices capable of receiving physical input such as key presses and translating them electronic signals for processor 18.

Voice interface module 14 is typically a means for converting voice input collected by a microphone and converting it to an electronic signal to be processed by either voice response digital signal processor module 16 or processor module 18.

Voice response digital signal processor module 16 is typically any commercially available or custom digital signal processor suitable for a voice recognition application. In the present invention, voice response module 16 is utilized to receive input from voice interface 14 and recognize the speech of the user and covert it to the proper code so that processor 18 can interpret future verbal input from the user, compare the codes, and generate the appropriate in-call DTMF signals in response as discussed in more detail below.

Processor module 18 is configured to first allow a user to generate address book entries, and subsequently to access those entries and accordingly convert voice commands issued by the user into in-call non-voice (DTMF) signals to be transmitted to an automated response platform. The process for generating the address book entries and subsequently accessing those entries and utilizing them to issue voice commands that are converted to in-call non-voice (DTMF) signals is discussed in detail below.

Storage module 20 is a typical electronic storage module configured to store the address book entries generated by the user and also to allow processor 18 to retrieve those entries as needed. Although storage module 20 is located within system 10 it is understood that this is intended to covey function and not location. Storage module 20 may be a separate storage for system 10, or alternatively, it may simply be a portion of existing storage on the device that system 10 is being implemented.

DTMF signal generator module 22 is configured to be used by system 10 to generate outgoing in-call DTMF tones to be sent over the voice line. These in-call signals are used to navigate automated response platform menus. It should be noted that other non-verbal in call-commands can be supported by system apart from DTMF. However, DTMF tones are used for exemplary purposes based on their common use in many automated response platforms.

It is understood that the above modules are exemplary modules for use in system 10, but in now way limit the scope of the present invention. For example, certain functions described herein may be combined to be implemented on a single module, or may be have the functions subdivided onto additional modules.

Furthermore, system 10 of the present invention may take the form of an entirely hardware embodiment, an entirely software (firmware, resident software, micro-code, etc. . . . ) embodiment, or an embodiment containing both software and hardware aspects. The present invention may take the form of a computer program product on a computer-usable or computer-readable storage medium having computer-usable or computer-readable program code embodied in the medium for use by or in connection with an instruction execution system.

Figure 2:
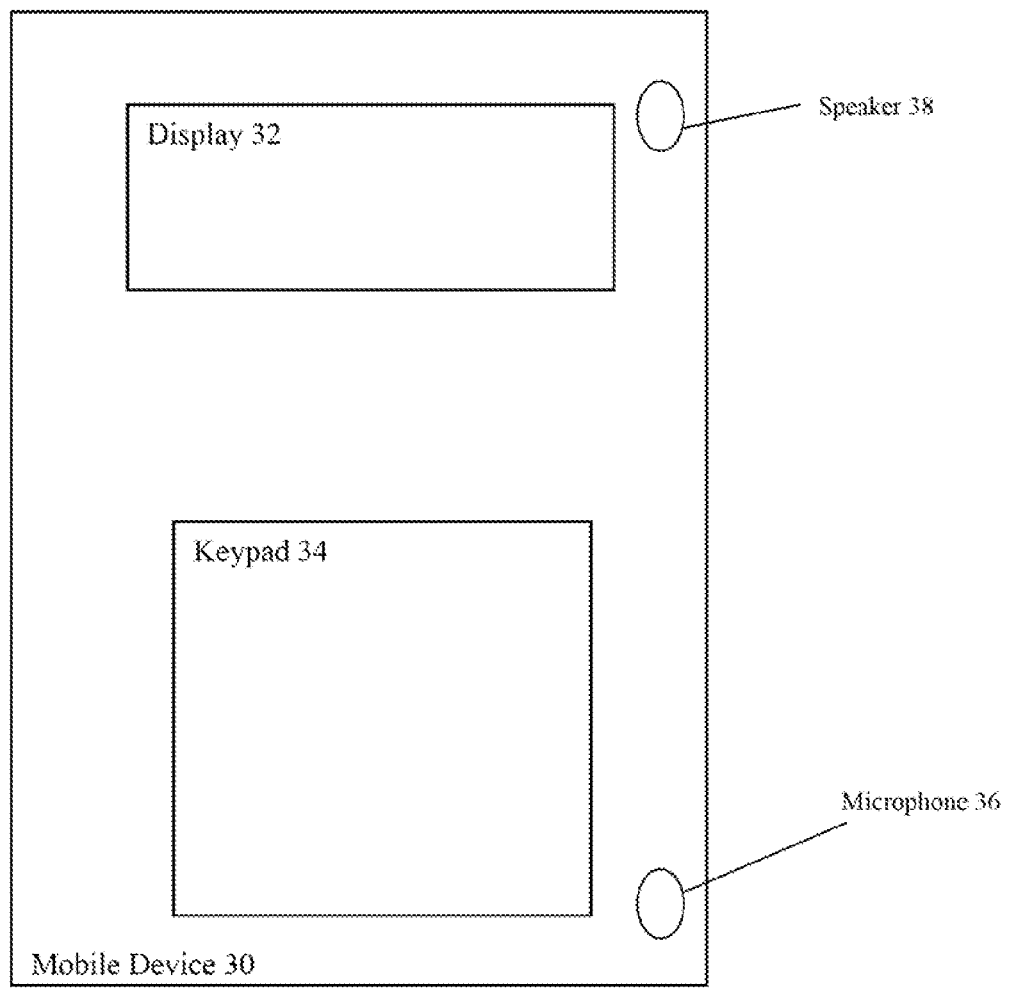
FIG. 2 illustrates a communication device employing the system of FIG. 1, in accordance with one embodiment of the present invention.

In one embodiment of the present invention as illustrated in FIG. 2, a mobile device 30 is shown having a display 32, a keypad 34, a microphone 36 and a speaker 38. Display 32 is a typical mobile device display that is used to allow the user to view the various address book entries. Keypad 34 is a standard keypad used on mobile devices for entering alphanumerical characters. Microphone 36 and speaker 38 are likewise typical input/output devices for receiving and transmitting verbal/sound communications from the device 30 to the user.

For the purposes of illustration, system 10 is described as being employed within mobile device 30. However, this is in no way intended to limit the scope of the present invention. For example, system 10 may be employed on an IP (VoIP) phone, landline phone, computer telephony equipment or any other telephony communication device that can support the processing required to implement the invention.

According to an exemplary embodiment of the present invention, FIG. 3 illustrates a typical address book entry 100. Address book entry preferably maintains a location name field 102, a location number field 104, a first voice command field 106, a first assigned keystroke field 108, an n voice command field 110 and an n assigned keystroke field 112.

Location name field 102 refers to the name of the entry, which typically identifies the desired telephonic destination/location having an automated response platform. Typical locations in this field may read "Bank 1," "Home Voice Mail, "Mobile Voice Mail," etc. . . . . . Location number field 104 is simply the telephone number for reaching the location identified in location name field 102.

First voice command field 106 refers to a menu navigation command that is employed by the automated response platform at the location identified in field 102. For example, if the location is a voice mail system, then first voice command field 106 would include any one of the typical menu navigation commands from the automated response platform such as "SAVE," "REPEAT MESSAGES," "SKIP TO NEXT MESSAGE," etc. . . . . The creation and storage of the digital codes stored in first voice command field 106 are discussed in more detail below.

First assigned keystroke field 108, is the corresponding DTMF tone number that is associated with the command stored in field 106. For example, if field 106 includes the command "SAVE" then field 108, assuming that the DTMF tone used in the voice mail automated response platform is "#6," simply contains the instructions for DTMF tone #6.

n voice command field 110 and n assigned keystroke field 112 are similar to fields 106 and 108 only they are for a next voice commands and associated assigned keystrokes. There are any number of fields 110 and 112 depending on the number of voice commands necessary to navigate the menu of the automated response platform at the location in field 102. Thus for each command included in the navigation menu of the location in location field 102 there is a corresponding n voice command field 110, as well as an associated n assigned keystroke field 112.

In the present example illustrated in FIG. 3, address book entry 100 has a location field 102 reading "Voice Mail Office" and associated location number field 104 of "9195551111p(pause)##123456". First voice command field 106 reads "SAVE" and associated assigned keystroke field 108 is "7." n(1)voice command field 110 reads "DELETE" and n(1) assigned keystroke field 112 is "3." n(2)voice command field 110 reads "REPLY" and n(2) assigned keystroke field 112 is "1." n(3)voice command field 110 reads "REPEAT" and n(3) assigned keystroke field 112 is "2." n(4)voice command field 110 reads "NEXT" and n(4) assigned keystroke field 112 is "5." Finally, n(5)voice command field 110 reads "HELP" and n(5) assigned keystroke field 112 is "0."

It is noted that although the entries for voice command fields 106 and 110 are discussed in terms of the spoken word used to designate the command it is understood that they are actually stored and processed as a code in database 20 and the other modules of system 10. The operation of entering the voice commands is discussed in more detail below with respect to FIG. 6.

In another exemplary embodiment of the present invention as illustrated in FIG. 4 a second address book entry 200 has a location field 202 reading "Voice Mail Mobile" and associated location number field 204 is "9195551234p(pause)##7654321". First voice command field 206 reads "SAVE" and associated assigned keystroke field 208 is "3." n(1)voice command field 210 reads "DELETE" and n(1) assigned keystroke field 212 is "2." n(2)voice command field 210 reads "REPEAT" and n(2) assigned keystroke field 212 is "6." n(3)voice command field 210 reads "NEXT" and n(3) assigned keystroke field 212 is "7." Finally, n(4)voice command field 210 reads "HELP" and n(4) assigned keystroke field 212 is "0."

In another exemplary embodiment of the present invention as illustrated in FIG. 5 a second address book entry 300 has a location field 302 reading "My Bank" and associated location number field 204 is "9195552222p(pause)." First voice command field 106 reads "BALANCE" and associated assigned keystroke field 308 is "11." n(1)voice command field 310 reads "ATM DEBITS" and n(1) assigned keystroke field 312 is "222." n(2)voice command field 310 reads "BACK" and n(2) assigned keystroke field 312 is "h." n(3)voice command field 310 reads "OPERATOR" and n(3) assigned keystroke field 312 is "0."

The above examples from FIGS. 3-5 are intended as only a few examples of possible address book entries 100. Any similar entries containing similar voice commands and associated DTMF signals for navigating automated response platforms are within the contemplation of the present invention.

Figure 6:
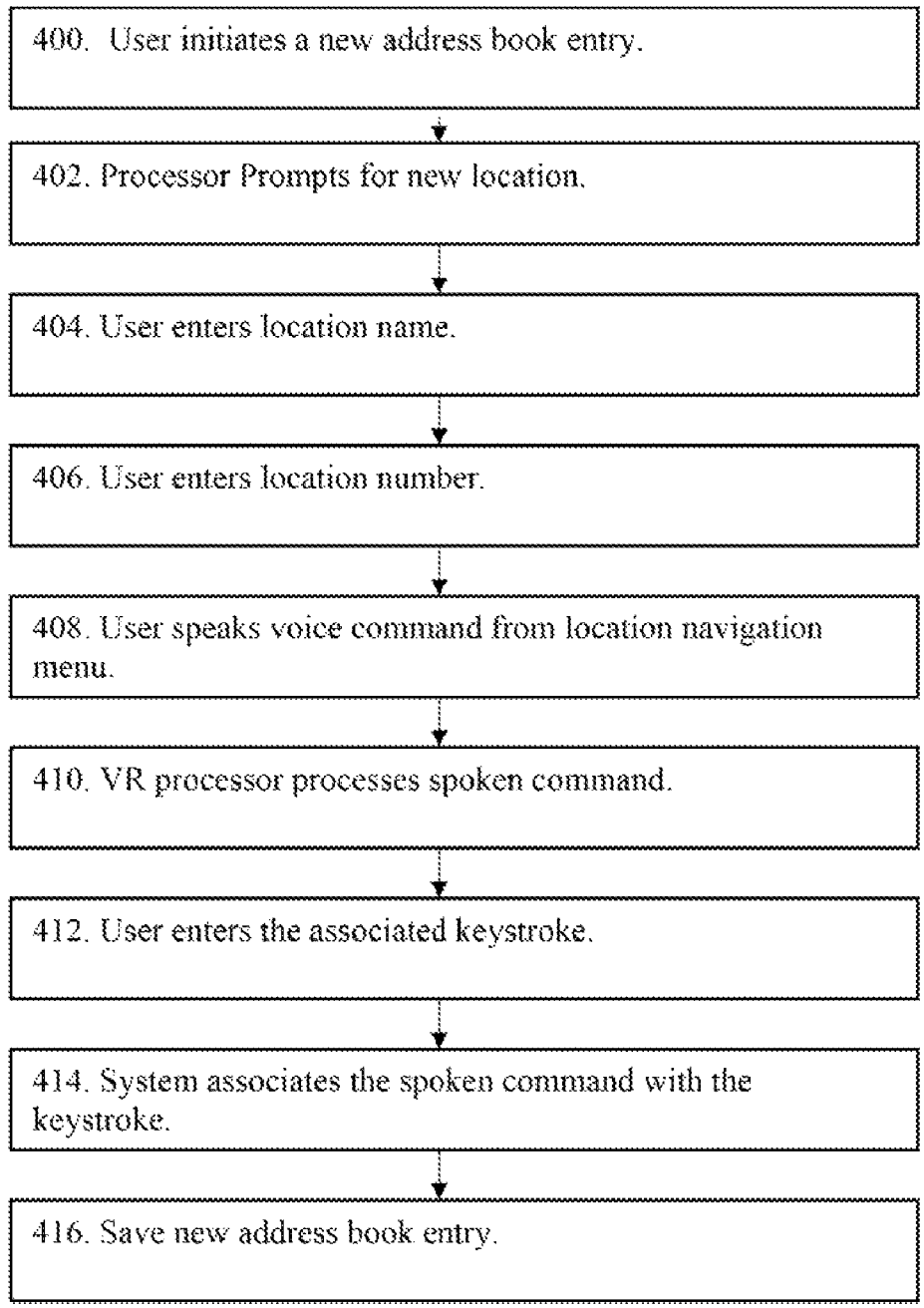
FIG. 6 is a flow chart for generating an address book entry from FIGS. 3-5 using the system of FIG. 1, in accordance with one embodiment of the present invention.

Turning now to the operation of generating address book entry 100 (or 200 and 300 etc. . . . ) at a first step 400 illustrated in flow chart FIG. 6, a user initiates and operation to open a new address book entry 100, and, at step 402, processor 18 sends a prompt on display 32 of mobile device 30 to enter a name and contact number.

At step 404, the user enters the name of the desired location having the automated platform to be accessed and stores the name in location name field 102. At step 406, the user adds the contact number to location number field 104. It is noted that, as in the examples, the key sequence for location number field 104 need not be limited to the destinations phone number as it may be desirable to include a login, password, personal identification number (PIN), or other type of code as part of this sequence. This allows a user to automatically login, for example, to an automated response system when communication is first established. Both the name of the location and the contact number for fields 102 and 104 can be entered verbally or alternatively by typing on keypad 34.

After the initial information is entered, the user is prompted by processor 18 to add a first voice command to first voice command field 106. Thus, taking the first example from FIG. 3, at step 408 the user speaks "SAVE" into microphone 36 of mobile device 30 which is sent by voice interface 14 to VR signal processor 16 for parsing. At step 410, VR signal processor 16 interprets the voice and creates a voice command code that is associated with the user's voice pattern when they speak the word "SAVE." This voice command code is a digital signature for the word(s) spoken by the user. The voice command code (digital signature for this spoken command) is stored in a first voice command field 106. As noted above, the discussion of voice command field 106 labels the entries by their actual spoken name, but it understood that such entries are stored as code understood by the various digital modules of system 10.

Once first voice command field 106 is stored, processor 18 prompts the user to enter an associated DTMF tone using keypad 34 of mobile device 30. Taking the example from FIG. 3, the associated DTMF signal for "SAVE" is "3." So, at step 412, the user simply presses the "3" key and at step 414, this DTMF signal is stored in first assigned keystroke field 108.

The key sequence from first assigned keystroke field 108 is associated with both a voice command in first voice command field 106 and the single telephonic destination as stored in location fields 102/104. This allows a user to use the same spoken command to perform a particular operation, such as "SAVE" at more than one automated response platform location without interference with using the same voice command in regards to a different address book entry such as address book entry 200 or 300 even if the keystrokes differ from location to location.

Thus, when a user makes a call to their voice mail at work (FIG. 3), only those voice commands associated with the "Voice Mail Office" address book entry 100 are valid, even though the user's two voice mail systems (FIGS. 3 and 4) share common voice commands (i.e., the SAVE, DELETE, REPEAT, NEXT, and HELP voice commands).

For each additional automated response platform navigation command, the user repeats steps 408-414 to fill as many n voice command fields 110 and n assigned keystroke fields 112 as necessary. When complete, at step 416, the user can press a done or save command, completing address book entry 100.

For the purposes of illustration it is assumed that the user knows the list of navigation commands used by the automated response platform at the location in field 102 as well as the associated DTMF tones. However, it is contemplated that system 10 may automatically download or otherwise electronically obtain the list of available navigation commands to simplify the above process, limiting the user's necessary input only to providing the required voice commands from steps 408 and 410 only. Furthermore, it is noted that each step may optionally include a confirmation affirmation sub-step to confirm that the input was accurate.

For example, a user may contact a directory assistance system 90 that has access to the navigational commands and associated DTMF tones for bank XYZ. A user could contact directory assistance system 90 and import the commands and associated DTM tones for fields 106, 108, 110 and 112 directly to processor 18 to be stored in address book 100. Processor 18 could simply prompt the user then to speak the commands one at a time as in step 408 above until all commands are finished.

The above described steps for generating address book entry 100 are intended only as exemplary steps. However, it is understood that any similar arrangement and process for generating an address book entry for converting voice commands into in-call non-verbal DTMF signals is within the contemplation of the present invention.

Figure 7:
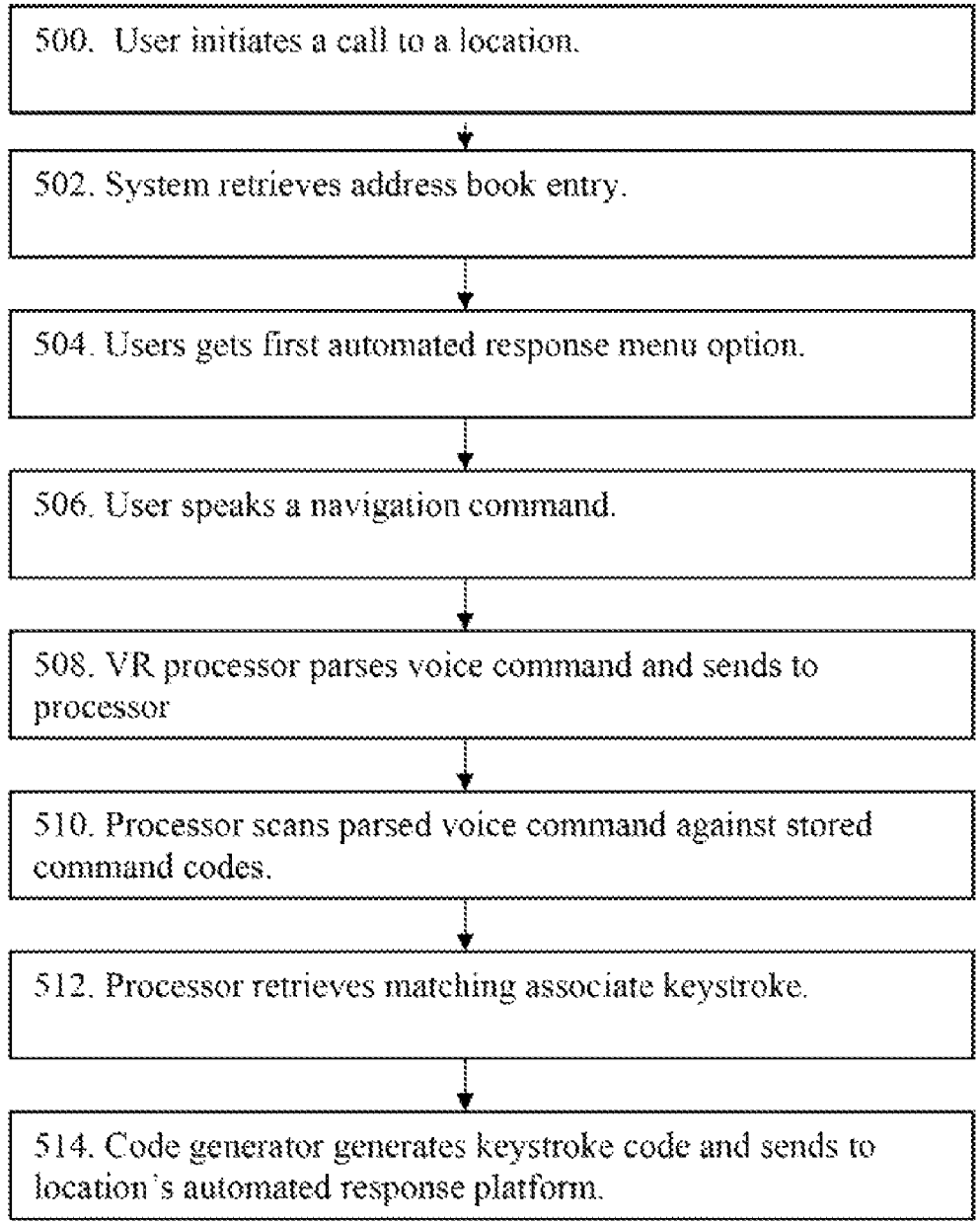
FIG. 7 is a flow chart for contacting an address book entry from any one of FIGS. 3-5, in accordance with one embodiment of the present invention.

Turning now to a call placed to address book entry 100, at first step 500, shown in flow chart FIG. 7, the user initiates a call to a desired location such as "Voice Mail Work" by either speaking the words "Voice Mail Work" or scrolling through on screen 32 of mobile device 30. At step 502, processor 18 recalls address book entry 100 from storage module 20.

Once connected, at step 504, the user is prompted as ordinary with an automated response platform navigation menu. Next, at step 506, rather than pressing keypad 34 instead, the user simply speaks a desired command into microphone 36. At step 508 VR signal processor 16 converts the spoken command into recognizable digital sequence or code and delivers it to processor 18. At step 510, processor 18, after receiving the VR processed signal/code consults the various voice command fields 106 and 110 in entry 100 for a match.

At step 512, when a match is found, processor obtains the corresponding DTMF tone from the associated DTMF field 108 or 112. At step 514, processor 18 commands DTMF signal generator to send an in-call DTMF tone to the automated response platform at the location which in turn accepts the navigation command and continues through the response.

Thus, by way of the present invention, a user may navigate an automated response platform at a desired telephonic location by voice command, even if the location does not support voice recognition navigation.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A system for facilitating communications with an automated response systems, said system comprising:
    a database for storing address book entries, said address book entries each related to a different entity and including a location name and contact number for said entities, said entities each employing an automated response platform that accept non-voice navigation commands,
    said database configured to electronically receive one more sets of available navigation commands for said entities for navigating each of said automated response platform to be stored in connection with address book entries for each of said entities;
    a voice interface for receiving user voice commands associated with one or more of said electronically received available navigation commands, wherein at least one user provided voice command is provided by a user via a mobile device and related to an assigned keystroke navigation command of said automated response platform of said entities;
    said system implemented during a mobile communication between a user and one of said entities, where when said communication is directed through said system to one of said entities, a corresponding address book entry is retrieved for the entity from said database;
    a voice response signal digital signal processor configured to receive a voice input from a user corresponding to at least one of said stored voice commands, related to a navigation command of said automated response platform, stored in said retrieved entry; and
    a telephonic signal generator, configured to receive voice input from said voice response signal digital signal processor, such that when said user utters said voice input corresponding to said stored voice command related to a navigation command, said system dictates a keystroke signal for delivery to said entity for navigating said automated response platform of said entity.

2. The system as claimed in claim 1, wherein said entities employing automated response platforms are selected from the group comprising voice mail systems, email systems and financial institutions.

3. The system as claimed in claim 1, wherein said contact number includes both the telephone number of the location as well as a password for a user account.

* * * * *

UNITED STATES PATENT AND TRADEMARK OFFICE
CERTIFICATE OF CORRECTION

PATENT NO.        : 8,396,193 B2
APPLICATION NO.   : 12/985513
DATED             : March 12, 2013
INVENTOR(S)       : McGary Page 1 of 1

It is certified that error appears in the above-identified patent and that said Letters Patent is hereby corrected as shown below:

In the Claims

Column 8, Claim 1 Line 17: the word "or" is missing after "one".

Column 8, Claim 2 Line 43: the word "dictates" should be "generates".

Signed and Sealed this
Fourth Day of June, 2013

Teresa Stanek Rea
*Acting Director of the United States Patent and Trademark Office*